United States Patent Office.

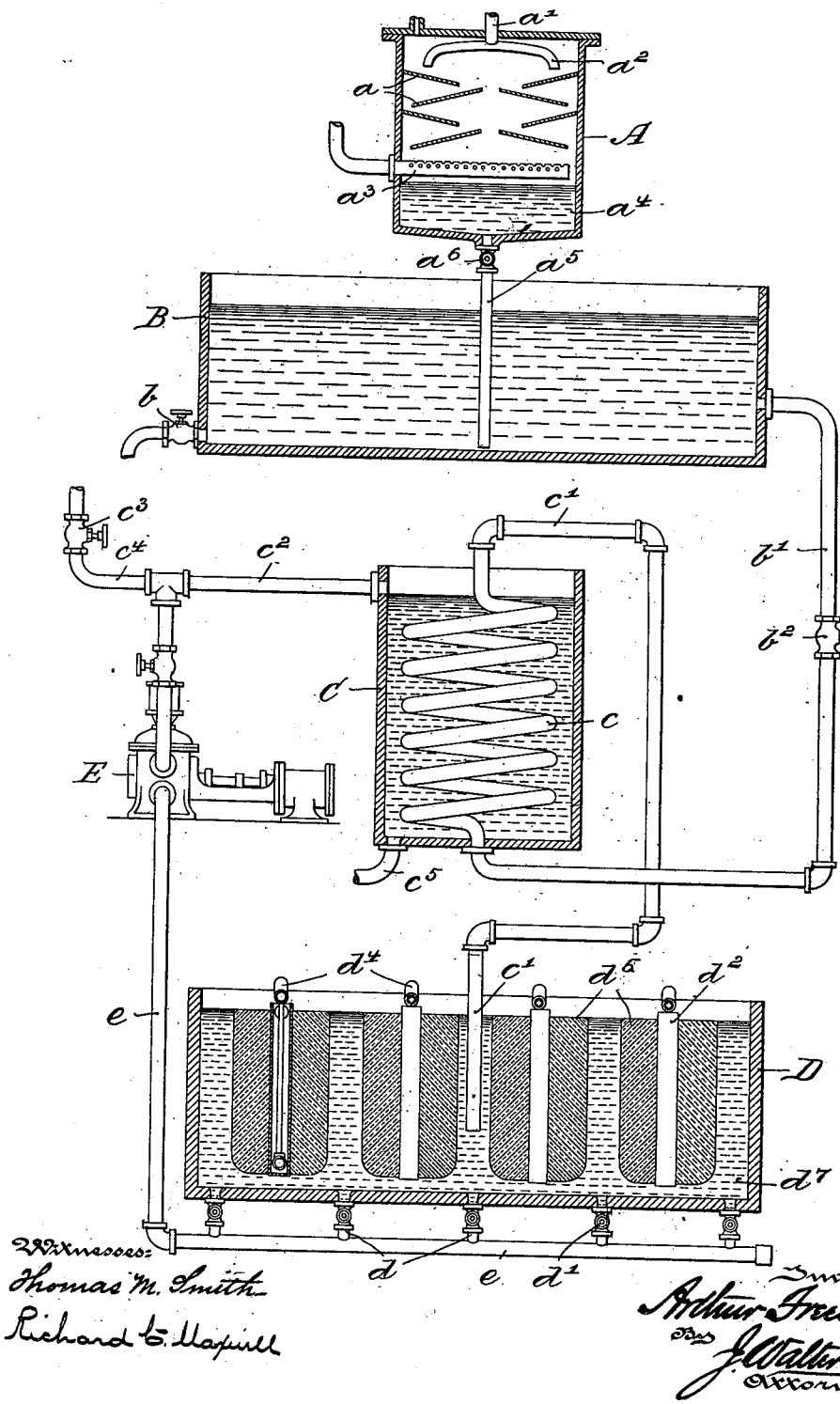

ARTHUR FREESTON, OF GERMANTOWN, PENNSYLVANIA, ASSIGNOR TO THE UNAGITATED WATER FREEZING COMPANY, OF SAME PLACE.

APPARATUS FOR MANUFACTURING ICE.

SPECIFICATION forming part of Letters Patent No. 672,036, dated April 16, 1901.

Application filed January 6, 1900. Serial No. 581. (No model.)

*To all whom it may concern:*

Be it known that I, ARTHUR FREESTON, a citizen of the United States, residing at Germantown, in the county of Philadelphia and State of Pennsylvania, have invented certain new and useful Improvements in Apparatus for Manufacturing Ice, of which the following is a specification.

My invention has relation to apparatus for producing ice in plate or block form in a pure state and without air-needles and internal honeycomb conditions.

The principal object of my invention is to provide an apparatus for producing plate or block ice solidly, cheaply, and expeditiously in a pure condition without air-needles and internal honeycomb conditions.

My invention consists of the improvements in apparatus for the manufacture of ice, substantially as hereinafter described and claimed.

The nature and characteristic features of my present invention will be more fully understood from the following description, taken in connection with the accompanying drawing, illustrating, partly in elevation and partly in section, an apparatus of my invention for the making of pure ice.

Referring to the drawing of the plant as illustrated, A represents a water-heater, provided internally with a series of staggered baffle-plates $a$, and above the same is a water-supply pipe $a'$, with a transverse distributing-branch $a^2$ for discharging the water onto the respective series of baffle-plates $a$ of the heater. Beneath the baffle-plates $a$ of the heater A is disposed transversely thereof a perforated steam-pipe $a^3$, leading from a source of steam-supply, (not shown,) and in the lower portion of said heater is provided a reservoir $a^4$, having an outlet-pipe $a^5$ with a stop-cock $a^6$. This outlet-pipe leads into an open tank or vessel B, within which the heated water of the apparatus A is conveyed, so that air and noxious gases carried therewith or contained in said water may be liberated therefrom into the atmosphere. The open tank or vessel B is provided with an outlet-cock $b$ for cleansing the same or removing sedimentation accumulating in the bottom of the same therefrom. This tank is also provided with an outlet-pipe $b'$, having a cock $b^2$, and which pipe leads to and is connected with a cooling-tank C, within which preferably the said pipe is formed into a coil $c$, and from which coil extends a pipe $c'$ into a freezing or ice-forming tank or vessel D.

$c^2$ is a pipe connected with the upper portion of the cooling-tank C, in connection with a suitable source for conveying cooled or cold water therethrough into the said tank or vessel C, and thereby to reduce the temperature of the water from the open tank B in its passage through the coils $c$ of the tank C and pipe $c'$ into the freezing or ice-forming tank or vessel D. This pipe $c^2$ is provided with a stop-cock $c^3$ and is connected by a T-shaped union with a pump E and from which pump a pipe $e$ extends to the lower portion of the freezing or ice-forming tank or vessel D and is connected therewith by means of a series of branch pipes $d$, each provided with a stop-cock $d'$. The freezing or ice-forming tank or vessel D is provided with a series of oblong cells $d^2$, adapted to contain brine, ammonia, or other freezing media, which is introduced into said cells through the series of pipes $d^4$. $d^5$ represents the blocks of ice formed in said freezing or ice-forming tank or vessel D between the brine-cells from each side thereof toward a median plane of the body of water contained between said cells, which water is frozen progressively in the direction of a median plane of the body of water contained therein.

$d^7$ represents the volume or body of water remaining after the formation of the ice between the ammonia or brine cells $d^2$ and which water at a lowered temperature may be utilized by being conducted through the branch pipes $d$ by opening the stop-cocks $d'$ thereof into the pipe $e$ and by means of the pump E may be forced by cutting off the supply of water through the branch $c^4$ of the pipe $c^2$ from the regular cooling source (not shown) into the cooling-tank C for lowering the temperature of the water therein and prior to its discharge into the freezing or ice-forming tank or vessel D. This, it will be understood, of course, will be possible after the first formation of the water into blocks or plates of ice of the character illustrated for the exemplification of the invention in the freezing or ice-forming tank or vessel D, thereby conserving the cooling of water from the main supply and utilizing what is regarded in such ice-making as a waste water to a greater or less extent for the cooling of the subsequently-treated water from the tank B in its passage through the tank C, and thus bringing the same into a condition whereby expeditious freezing takes place after the temperature of the water has been reduced by passage through the cooling-tank C into the freezing or ice-forming tank or vessel D for assuming in due course blocks or plates of ice progressively produced in the direction of a median plane of the body of water from the brine or ammonia cells $d^2$ of the freezing or ice-forming tank or vessel D. In the cooling-tank is provided an outlet-pipe $c^5$, which may be connected with any suitable waste-receptacle. After the freezing or ice-forming tank D has received its full quota of water to become ice in the form, for example, as illustrated the stop-cock $b^2$ of the pipe $b'$ is turned so as to cut off the supply of water from the tank B through the cooling-tank C, and hence the supply of water contained in the freezing or ice-forming tank or vessel D during freezing of the same progressively into blocks or plates of ice remains in substantially a quiescent state, which is desirable for assuring blocks or plates of ice without honey-combed conditions and without internal air-needles. In the main such conditions are obviated according to my invention of producing ice by the treatment of the water in the manner hereinbefore explained of heating the same prior to its introduction into the open tank, because through the delivery of the water into and its rising in said open tank B air and noxious gases will be readily liberated therefrom and anterior to the reduction of the temperature of the water without coming into contact with the atmosphere and prior to its assuming a more or less quiescent state in the freezing or ice-forming tank or vessel D to become plates or blocks of ice.

Having thus described the nature and object of my invention, what I claim as new, and desire to secure by Letters Patent, is—

1. An apparatus for manufacturing ice, comprising a heater provided with staggered baffle-plates, a water-supply above the same, a steam-supply beneath said plates, an open tank connected with said heater and adapted to receive the heated water from said heater to permit of the liberation of air and gases from the water, a cooling-tank connected with said open tank, means for reducing the temperature of the water in its transit through said tank, without the reduced water coming into contact with the atmosphere and an ice-forming tank or vessel provided with a series of cells for containing brine, ammonia or other freezing media, substantially as and for the purposes described.

2. An apparatus for manufacturing ice, comprising a heater provided with staggered baffle-plates, a water-supply above the same, a steam-supply beneath said plates, an open tank connected with said heater and adapted to receive the heated water from said heater to permit of the liberation of air and gases from the water, a cooling-tank connected with said open tank, means for reducing the temperature of the water in its transit through said tank, without the reduced water coming into contact with the atmosphere, an ice-forming tank or vessel provided with a series of cells for containing brine, ammonia or other freezing media, and means connected with a pump for removing surplus lowered-temperature water therefrom and utilizing the same in said cooling-tank, substantially as and for the purposes described.

3. An apparatus for manufacturing ice, comprising a heater connected with an open tank and the latter connected with a cooling-tank having therein a coiled pipe and a pipe connection with a freezing or ice-forming tank or vessel having a series of cells for containing brine, ammonia or other freezing media, branch pipes from the bottom of said tank or vessel connected with a pipe and the latter with a pump, and a pipe from a source of supply provided with a cock and also connected with said pump-pipe, whereby surplus lowered-temperature water from said freezing or ice-forming tank or vessel may be utilized for reducing the temperature of the water in its passage through said cooling-tank, substantially as and for the purposes described.

In testimony whereof I have hereunto set my signature in the presence of two subscribing witnesses.

ARTHUR FREESTON.

Witnesses:
J. WALTER DOUGLASS,
RICHARD C. MAXWELL.